June 21, 1960 — L. C. SCHAEFER — 2,942,125
TERMINAL BOARD FOR DYNAMOELECTRIC MACHINES
Filed Jan. 23, 1956 — 4 Sheets-Sheet 1

June 21, 1960 L. C. SCHAEFER 2,942,125
TERMINAL BOARD FOR DYNAMOELECTRIC MACHINES
Filed Jan. 23, 1956 4 Sheets-Sheet 2

WITNESSES:
Leon M. Garman
Wm. L. Groome

INVENTOR
Langdon C. Schaefer
BY
ATTORNEY

June 21, 1960   L. C. SCHAEFER   2,942,125
TERMINAL BOARD FOR DYNAMOELECTRIC MACHINES
Filed Jan. 23, 1956   4 Sheets-Sheet 3

United States Patent Office 2,942,125
Patented June 21, 1960

2,942,125

TERMINAL BOARD FOR DYNAMOELECTRIC MACHINES

Langdon C. Schaefer, Lima, Ohio, assignor to Westinghouse Electric Corporation, East Pittsburgh, Pa., a corporation of Pennsylvania Filed Jan. 23, 1956, Ser. No. 560,483

4 Claims. (Cl. 310—71)

The present invention relates to the construction of dynamoelectric machines and, more particularly, to such a machine having an improved terminal board of unitized construction mounted in a manner which greatly facilitates and simplifies the assembly and connections of the machine.

The invention is particularly advantageous for single-phase electric motors, although it will be obvious that its usefulness is not restricted to any specific type of machine and the principles of the invention are applicable to dynamoelectric machines of any type.

Single-phase electric motors include a number of accessory or auxiliary devices which must be mounted in or on the motor and properly connected to each other and to the motor windings. Such accessory devices may include line terminals, a starting switch, a thermal protective device, means for reversing the direction of rotation, means for changing the motor connections for operation on different voltages, and possibly other devices. In the conventional construction of single-phase motors, these devices are usually mounted in one of the end brackets, the line terminals usually being carried on a small terminal board which may also carry movable links or other means for changing the motor connections. In the assembly of the motor, these various devices must be mounted in place in the bracket and connected to each other and to the motor windings, which results in a relatively difficult and expensive assembly operation because of the many connections that must be made and the relatively complicated wiring which frequently results from this arrangement. This conventional construction is thus undesirably expensive, and is also undesirable because of the opportunity for errors in making the connections, and because welded connections must be made between the motor winding leads in the frame and flexible leads extending from the terminal board or other devices in the end bracket. The location of these accessory devices in the bracket not only makes the connection of the motor difficult, but makes it impossible to remove the bracket for inspection or repair without disturbing the wiring.

The principal object of the present invention is to provide a dynamoelectric machine of simplified arrangement which eliminates the difficulties described above and makes possible a simple and inexpensive assembly.

Another object of the invention is to provide an electric motor in which all accessory devices are mounted on a terminal board of unitized construction which carries the necessary circuit means for connecting the accessory devices and which can be directly connected to the motor windings, thus making possible a greatly simplified assembly operation and simplifying the motor connections.

A further object of the invention is to provide an electric motor having a unitized terminal board assembly which carries all accessory devices and circuit means for connecting them together, so that the entire assembly can be mounted as a unit in the motor frame, preferably on the stator core, and directly connected to the windings, thus greatly simplifying the assembly and reducing the possibility of errors in wiring, while making it possible to remove the end bracket without disturbing the wiring.

Other objects and advantages of the invention will be apparent from the following detailed description, taken in connection with the accompanying drawings, in which.

Figure 5:
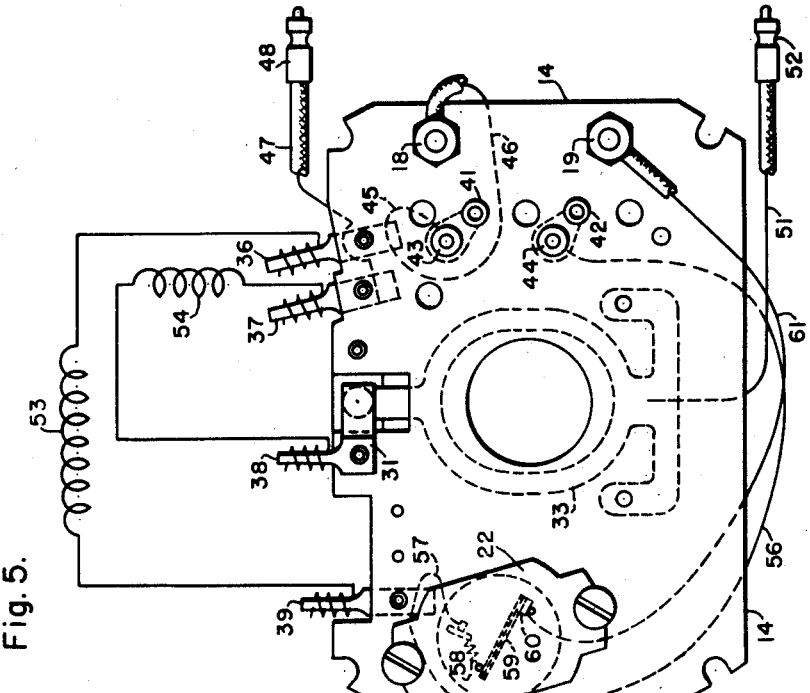
Figure 4:
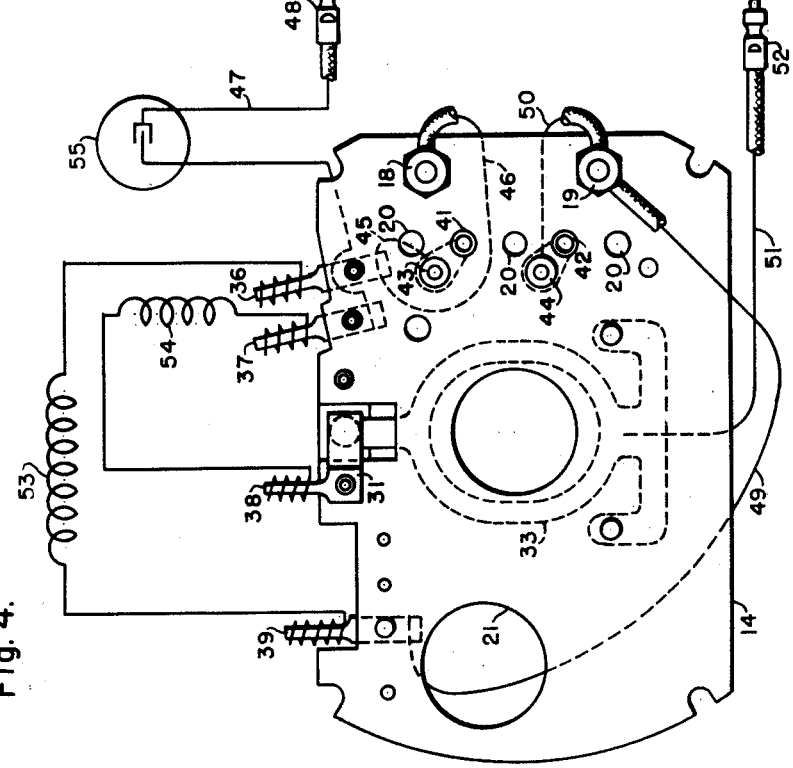
Figure 7:
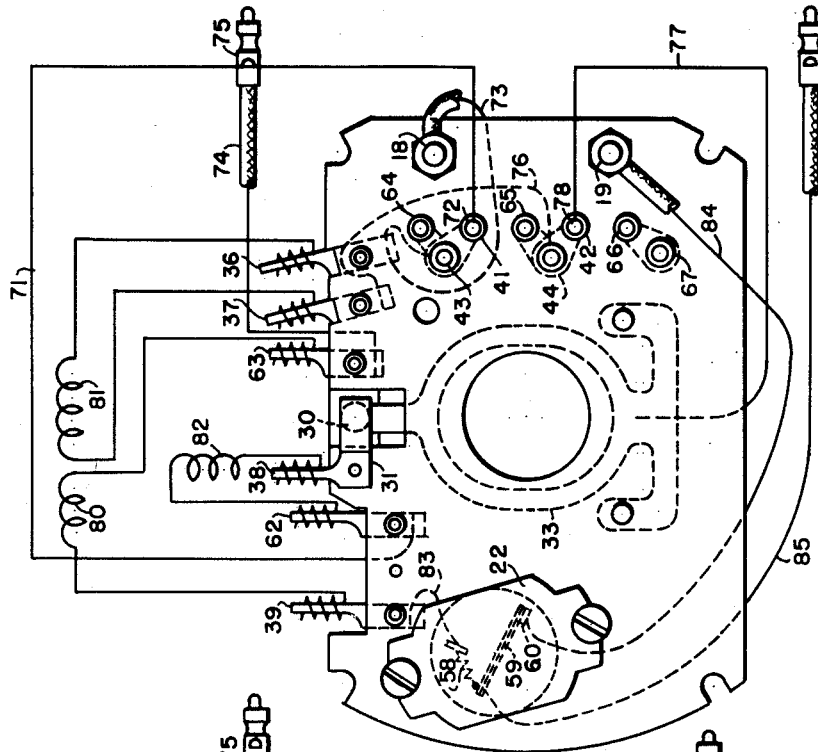
Figure 6:
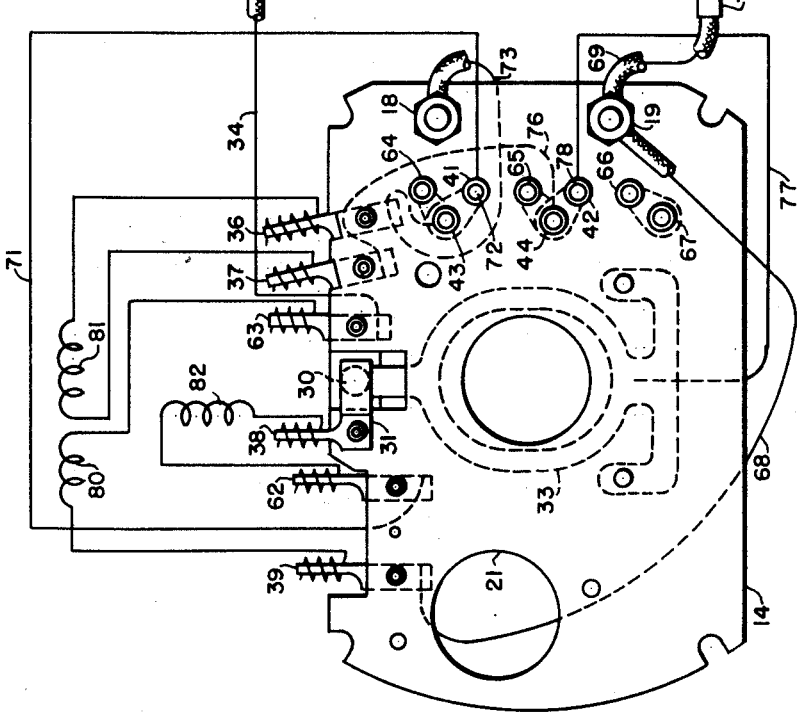

Figs. 4 and 5 are schematic diagrams showing the terminal board as seen from the outside of the motor, and showing the wiring connections for a single-phase, single-voltage motor without and with thermal protection, respectively; and Figs. 6 and 7 are similar diagrams showing the application of the terminal board to single-phase, dual-voltage motors without and with thermal protection, respectively.

As previously indicated, the invention is particularly suitable for single-phase electric motors, and is shown in the drawing embodied in a machine of this type. The actual construction of the motor itself may be of any usual or desired type. The particular machine shown in the drawing for the purpose of illustration has a frame member 1, in which is supported a laminated stator core 2 carrying primary windings 3 of any suitable type. The machine is closed at the ends by end brackets 4 and 5 which may be secured to the frame member 1 in any desired manner, as by through bolts 6. The end brackets 4 and 5 may have central hub portions 7 in which are mounted sleeve bearings 8 and which may also include suitable lubricating means for the bearings, such as oil-soaked wicking 10. The shaft 11 of the motor is supported in the bearings 8 and carries a laminated rotor core 12 on which is placed a secondary winding 13, shown as a squirrel-cage winding. It will be understood that the details of construction shown are not a part of the invention and that the machine may be of any usual or desired construction.

As previously mentioned, in the conventional construction of single-phase motors, the various accessory devices, such as the starting switch, protective device, line terminals, and other devices, have been mounted in one of the end brackets and connected to each other by wiring in the end bracket with leads extending therefrom which were welded, or otherwise connected, to the motor winding leads in the frame. The numerous disadvantages of this conventional arrangement are eliminated by the present invention in accordance with which a terminal board 14 is provided on which all the accessory devices are mounted and which carries circuit means for effecting the necessary connections between these devices. This unitized arrangement makes it unnecessary to mount any of the accessory devices in the bracket and no additional wiring is required, and the terminal board can be mounted in or on the motor frame.

Figures 1, 2:
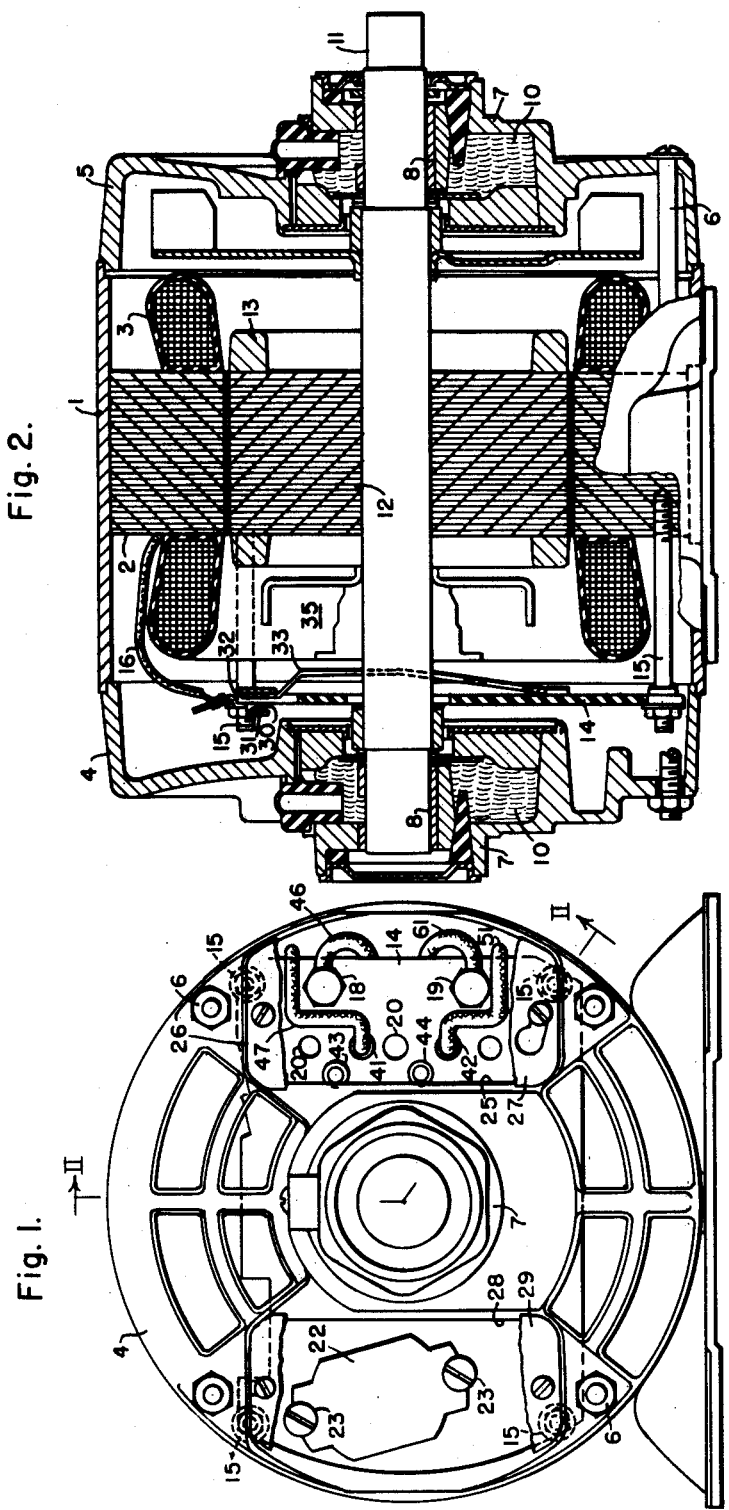
Figure 1 is an end view of an electric motor embodying the invention.
Fig. 2 is a longitudinal sectional view of the motor, the section being taken approximately on the line II—II of Fig. 1.

As shown in Figs. 1 and 2, it is preferred to mount the terminal board 14 directly on the stator core 2 by means of studs 15 threaded or pressed into the core. It will be obvious, however, that the terminal board 14 could be supported from the frame 1 in any other manner, if desired. It will be seen that this makes possible a very simple and inexpensive assembly operation, since the board 14 can be mounted directly in place on the studs 15 and it is only necessary to connect the winding leads to the board. Fig. 2 shows one such lead 16 connected directly to a terminal device on the terminal board 14, and it will be seen that no joints are required between the winding leads and conductors extending from accessory devices mounted in the end bracket, which have heretofore been necessary. This is an important advantage because of the difficulty of making such connections and also because the end bracket can be removed without disturbing the wiring.

Figure 3:
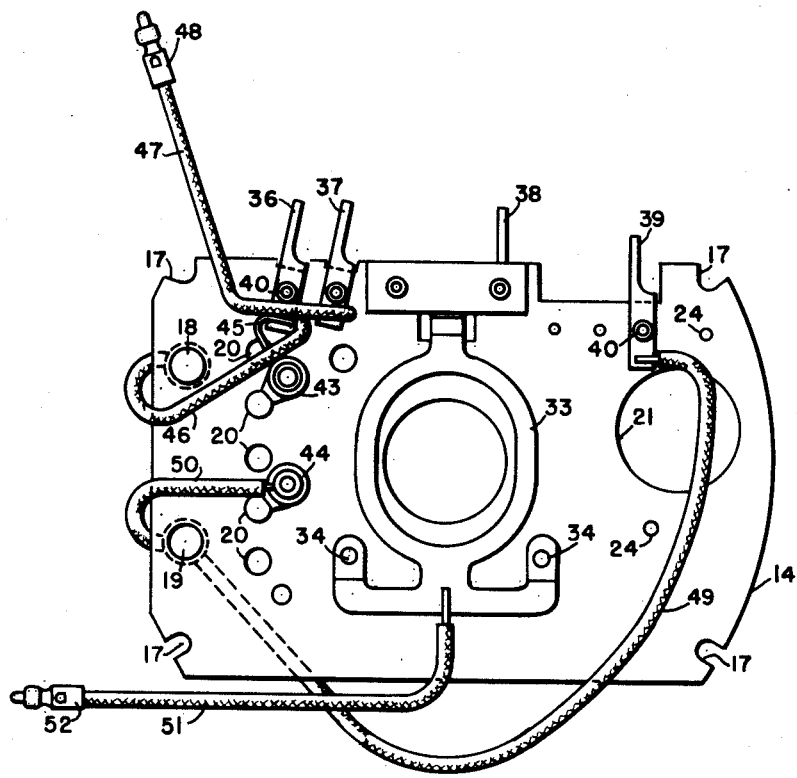
Fig. 3 is a view of a complete terminal board looking from the inside of the motor.

The terminal board 14 is shown in detail in Fig. 3 of the drawing, which shows the inside of the board, that is, the side of the board which faces the interior of the motor. The terminal board 14 may be made of any suitable rigid insulating material and is generally rectangular in outline with mounting slots 17 at the corners to receive the studs 15. The board has a central opening of sufficient size to allow the shaft 11 to pass through the opening with ample clearance. Terminal studs 18 and 19 are mounted on the outside of the board at one side thereof for connection to an external line, and a series of five openings 20 are formed in the board adjacent the terminal studs for receiving sockets for effecting changes in the connections of the windings, as hereinafter described. A larger opening 21 is provided at the opposite side of the terminal board for receiving a thermal protective device. When such a protective device is used, it is mounted in or over the opening 21, as shown for example in Figs. 1 and 5 of the drawing, which show a thermal protective device 22 of any usual type mounted in the opening 21, so that its terminals are accessible from the inside of the terminal board, and secured in place by screws 23 in openings 24 in the terminal board.

The terminal board 14 is mounted on the stator core 2 adjacent the end bracket 4. The end bracket 4 has an opening 25 positioned opposite one end of the terminal board so that the terminal studs 18 and 19 and the openings 20 are accessible through the opening 25. The opening 25 may be provided in a terminal box 26 cast integrally with the end bracket 4 and is normally closed by a removable cover 27. If desired, a similar opening 28 may be provided on the opposite side of the end bracket 4, to permit access to the protective device 22, and is normally closed by a removable cover 29. Suitable openings or knockouts of the usual type may be provided in the terminal box 26 to permit line leads to be brought into the terminal studs 18 and 19.

The terminal board 14 also carries a motor starting switch which includes a stationary contact 30 mounted on a conducting strip 31 attached to the top of the board 14 and a movable contact 32 carried on a spring 33 which is riveted to the terminal board at 34. The starting switch is arranged to be actuated by a centrifugal device, generally indicated at 35, which is carried on the shaft 11 and which may be of any suitable type. The centrifugal device 35 engages the spring 33 to hold the contacts 30 and 32 in engagement when the motor is at rest, and releases the spring 33 to disengage the contacts when the motor reaches a predetermined speed of operation. The terminal board 14 also carries terminal devices 36, 37, 38 and 39 for connection to the motor windings. The terminals 36, 37 and 39 may be attached to the board by eyelets or rivets 40 and the terminal 38 is attached to the conducting strip 31 which carries the switch contact 30.

The terminal board 14, as so far described, is suitable for use in motors of numerous different types, with appropriate modification in the circuit connections, as described below for certain illustrative motor types. The board may be harness wired, as shown in the drawings, or the circuit connections may be provided on the board in any other desired manner, as by applying them to the board by printed circuit techniques.

Figs. 3 and 4 show the board arranged for a single voltage motor without thermal protection, Fig. 4 showing the outside of the board and the connections to the motor windings. In this arrangement, conducting sockets 41 and 42 are placed in the second and fourth of the openings 20 and secured in place by eyelets 43 and 44, respectively, which also provide for electrical connection to the sockets. The terminal 36 is connected to the eyelet 43 by a connector 45, and a conductor 46 connects the terminal 36 to the terminal stud 18, the conductor 46 being clamped under the stud 18 on the outside or front of the board. A conductor 47 is connected to the terminal 37 and carries a plug connector 48 on its end which is adapted to be inserted in either one of the sockets 41 and 42. A conductor 49 is connected to the terminal 39 and is clamped under the terminal stud 19 on the front of the board. Another conductor 50 extends from the terminal stud 19 to the eyelet 44 for connection to the socket 42. A conductor 51 is soldered or otherwise connected to the switch spring 33 and terminates in a plug connector 52 adapted for insertion in either one of the sockets 41 and 42.

Fig. 4 shows the connections of this terminal board to the motor windings. The main or running winding 53 of the motor is connected between the terminals 36 and 39, and the auxiliary or starting winding 54 of the motor is connected between terminals 37 and 38. Fig. 4 also shows a capacitor 55 connected in the conductor 47 and thus shows a motor of the capacitor-start type. It will be understood that the connections would be exactly the same for a motor of the split-phase type except that the capacitor 55 would be omitted, as in Fig. 5.

It will be seen from Fig. 4 that the motor windings are connected to the line in the usual manner. Thus, the line leads (not shown) are brought into the terminal box 26 and connected to the terminal studs 18 and 19. The plug connector 48 is inserted in one of the sockets, such as the socket 41, and the plug connector 52 is inserted in the other socket 42. The main winding circuit extends from the terminal stud 18 through the conductor 46 and terminal 36 to one end of the main winding 53, and from the other end of the main winding 53 through the terminal 39 and conductor 49 to the terminal stud 19. The auxiliary winding circuit extends from the terminal stud 18 through conductor 46 to eyelet 43 and socket 41, plug connector 48, conductor 47 and terminal 37 to the auxiliary winding 54, and from the other end of the auxiliary winding to terminal 38, through the switch to conductor 51, plug connector 52, socket 42 and conductor 50 to the line terminal 19. Thus the two windings are in parallel across the line in the usual manner with the starting switch in series with the auxiliary winding. It will also be seen that the direction of rotation of the motor can readily be reversed by removing the plug connectors 48 and 52 from the sockets 41 and 42 and interchanging them to reverse the connection of the auxiliary winding with respect to the main winding.

Thus, a completely wired terminal board is provided which can be mounted as a unit in the motor frame and which requires only to be connected directly to the winding leads without intermediate connections. Assembly of the motor is therefore greatly simplified and possibility of error in connecting the motor is substantially eliminated. The direction of rotation can easily be changed by the user of the motor without risk of error merely by interchanging the plug connectors 48 and 52.

The same terminal board, with minor changes in connections, can be used for a single voltage, thermally protected motor, as shown in Fig. 5. The terminal board 14 in this figure is the same as that of Fig. 4, with the thermal protector 22 mounted in the opening 21 in the manner previously described, and as shown in Fig. 1. The wiring connections are slightly modified from those of Figs. 3 and 4 by eliminating the conductor 49 and replacing it by a conductor 56 which connects the terminal 39 to the socket 42 by means of the eyelet 44. The terminal 39 is also connected to the protective device 22 by a connector 57. The protective device 22 may be of any suitable or usual type, and is shown diagrammatically as including a heater 58 connected in series with a bimetallic element 59 which is arranged to actuate normally closed contacts 60 to open them when the bimetallic element is heated above a predetermined temperature, either by the heater 58 or by direct heating from the motor itself. The connector 57 is connected to the heater 58 and the contacts 60 are connected to the terminal stud 19 by a conductor 61.

The motor windings 53 and 54 are connected to the terminals on the board 14 as previously described, and the plug connectors are inserted in the sockets 41 and 42 as before. The main winding circuit extends from the line terminal 18 through conductor 46 and terminal 36 to one end of the main winding 53 and from the other end of the main winding to the terminal 39, connector 57, protective device 22 and conductor 61 to line terminal 19. The auxiliary winding circuit extends from the line terminal 18 through conductor 46, socket 41, plug 48, conductor 47, and terminal 37 to the auxiliary winding 54 and from the other end of the winding 54 to terminal 38, through the starting switch, conductor 51, plug 52, socket 42, conductor 56, protective device 22 and conductor 61 to line terminal 19. Thus, the main and auxiliary windings are in parallel across the line with the protective device in series with them to carry the motor current and to disconnect the motor by means of the contacts 60 in response to excessive current or excessive temperature rise. As before, the direction of rotation is readily reversed by interchanging the plugs 48 and 52 to reverse the connection of the auxiliary winding 54 with respect to the main winding.

The same terminal board, with suitable modifications, may also be used for a dual voltage motor, as shown in Figs. 6 and 7. Referring first to Fig. 6, two additional terminals 62 and 63 are mounted on the terminal board 14, and three additional sockets are provided in the three openings 20 which were unused in Figs. 4 and 5. Thus, a socket 64 is placed in the uppermost opening 20 and connected to the eyelet 43, a socket 65 is placed in the central opening 20 and connected to the eyelet 44, and a socket 66 is placed in the bottom opening 20 and held in place by an eyelet 67.

The wiring of the terminal board is somewhat modified from that described above and includes a conductor 68 connecting the terminal 39 to the line terminal 19. A conductor 69 is also connected to the terminal 19 and terminates in a plug 70 adapted to be inserted in either of the sockets 65 or 66. The terminal 62 is connected to a conductor 71 which terminates in a plug connector 72, which is shown inserted in the socket 41 to avoid confusion, but which may be inserted in either of the sockets 41 or 42. The sockets 41 and 64 are connected by means of the eyelet 43 to the terminal 36 and to the line terminal 18 by a conductor 73. The terminal 63 is connected to a conductor 74 which terminates in a plug 75 adapted to be inserted in either of the sockets 64 or 65. The terminal 37 is connected by a conductor 76 to the eyelet 44 and thus to the sockets 42 and 65. A conductor 77 is connected to the switch spring 33 and terminates in a plug 78 which is shown inserted in the socket 42, to avoid confusion, but which may be inserted in either of the sockets 41 or 42.

The motor windings are connected to the terminal board in the manner shown in Fig. 6. Since this is a dual voltage motor, the main or running winding has two sections 80 and 81. The main winding section 80 is connected between the terminals 39 and 63, and the main winding section 81 is connected between the terminals 36 and 37. The auxiliary winding 82 is connected between terminals 38 and 62.

This motor is adapted for operation on either of two voltages as determined by the location of the plugs 70 and 75. If the plug 75 is inserted in the socket 64 and the plug 70 in the socket 65, the motor is connected for low-voltage operation. Thus, if a single-phase line is connected to terminals 18 and 19 as previously described, one side of the line is connected through conductor 73 to terminal 36 and to the main winding section 81, the other end of the main winding section 81 being connected through terminal 37 and conductor 76 to socket 65, plug 70 and conductor 69 to line terminal 19. The other main section winding 80 is connected to the line terminal 18 through terminal 63, conductor 74, plug 75, socket 64 and conductor 73 to line terminal 18. The other end of the main winding section 80 is connected through terminal 39 and conductor 68 to line terminal 19. The auxiliary winding 82 is connected to line terminal 18 through terminal 62, conductor 71, plug 72, socket 41 and conductor 73. The other end of the auxiliary winding 82 is connected through terminal 38, starting switch, conductor 77, plug 78, socket 42, socket 65, plug 70 and conductor 69 to line terminal 19. Thus, all three windings 80, 81 and 82 are in parallel across the line, and the motor will operate on a low voltage, such as 115 volts. As before, the direction of rotation can easily be reversed by interchanging the plugs 72 and 78 in the sockets 41 and 42, which reverses the connection of the auxiliary winding with respect to the main winding.

The motor is connected for high voltage operation by inserting the plug 75 in socket 65 and the plug 70 in socket 66. When thus connected, the main winding circuit extends from line terminal 18 through conductor 73, terminal 36, winding section 81, terminal 37, socket 65, plug 75, conductor 74, terminal 63, winding section 80, terminal 39 and conductor 68 to line terminal 19, so that the two winding sections 80 and 81 are in series across the line. The auxiliary winding circuit is the same as previously traced, so that the auxiliary winding 82 is in parallel with the winding section 81, through conductor 76, and is thus subjected to the same voltage as in the low-voltage connection. The conductor 69 is not used in the high-voltage connection but the plug 70 is inserted in the socket 66 to avoid leaving it loose in the motor.

The arrangement of Fig. 6 thus provides a unitary terminal board which is mounted in the motor frame and directly connected to the windings, with the advantages previously mentioned. This arrangement provides a very simple way for changing the motor connections for operation on either of two voltages, such as 115 volts and 230 volts, merely by changing the position of the plugs 70 and 75, and, as before, the direction of rotation can readily be reversed by interchanging the plugs 72 and 78 in the sockets 41 and 42 to reverse the connection of the auxiliary winding.

Fig. 7 shows the terminal board 14 adapted for use in a thermally protected, dual voltage motor. In this arrangement a thermal protective device 22, as previously described, is mounted in the opening 21 in the terminal board. The connections are generally similar to those of Fig. 6, slightly modified by connecting the terminal 39 to the heater 58 of the protective device by a connector 83 and by connecting the contacts 60 of the protective device to the line terminal 19 by a conductor 84. A conductor 85 is connected to a terminal of the protective device between the heater 58 and bimetallic element 59 and terminates in a plug 86 adapted for insertion in either of the sockets 65 or 66.

For low-voltage operation, the plug 75 is inserted in the socket 64 and the plug 86 in the socket 65. The circuit for the main winding then extends from the line terminal 19 through conductor 84 to the contacts 60 of the protective device 22 and through conductor 85, plug 86, socket 65, conductor 76 and terminal 37 to one end of the main winding section 81. The other end of the main winding section 81 is connected through terminal 36 and conductor 73 to line terminal 18. The circuit of the main winding section 80 extends from the protective device contacts 60 through the heater 58, connector 83 and terminal 39 to the winding section 80 and from the other end of the winding section 80 to terminal 63, conductor 74, plug 75, socket 64 and conductor 73 to line terminal 18. Thus, the two main winding sections are in parallel, with the heater 58 in series with the section 80. The auxiliary winding circuit extends from the line terminal 18 through conductor 73, socket 41, plug 72, conductor 71, terminal 62, auxiliary winding 82, terminal 38, starting switch, conductor 77, plug 78, socket 42, socket 65, plug 86, conductor 85, protective device contacts 60 and conductor 84 to line terminal 19. Thus the auxiliary winding is in parallel with the main winding sections, and the protective device contacts 60 are in series with all three windings.

For high voltage operation, the plug 75 is inserted in socket 65 and plug 86 is inserted in socket 66. The main winding circuit then extends from line terminal 19 through conductor 84, protective device contacts 60, heater 58, connector 83, terminal 39, winding section 80, terminal 63, conductor 74, plug 75, socket 65, conductor 76, terminal 37, winding section 81, terminal 36 and conductor 73 to line terminal 18, so that the two main winding sections are in series. The auxiliary winding circuit extends from line terminal 18 through conductor 73, socket 41, plug 72, conductor 71, terminal 62, auxiliary winding 82, terminal 38, starting switch, conductor 77, plug 78 and socket 42, which is connected to socket 65 and conductor 76 so that the auxiliary winding is across the main winding section 81. Thus, the motor is connected in the usual way for high voltage operation, the motor being reversible as before by interchanging the plugs 72 and 78 in the sockets 41 and 42.

Figs. 6 and 7 show motors of the split-phase type but it will be obvious that the same circuits would be used for capacitor-start motors, with a capacitor in series with the auxiliary winding.

It will be seen that in all of the modifications described a terminal board is provided which carries all the accessory devices required for operation of the motor, with circuit means for effecting the necessary connections between them. This unitized terminal board, therefore, can be mounted directly on the stator core, or otherwise supported from the frame of the motor, and directly connected to the motor windings. That is, the winding leads are directly connected to the terminals on the terminal board without intermediate connections. This eliminates a difficult problem which has previously existed in making such intermediate connections, and permits the use of simple connecting means such as the wrap type terminals shown diagrammatically in the drawings. This arrangement has the further great advantage that no accessory devices are mounted in the end bracket and there is no wiring in the bracket. For this reason, assembly of the motor is greatly facilitated and the time required and cost are considerably reduced, while the possibility of errors in wiring is substantially eliminated. It is also possible to entirely remove the bracket for inspection or repair without disturbing the wiring, which was not possible in the conventional construction except by breaking some of the wiring connections, which was undesirable both because of the difficulty involved in breaking the connections and reconnecting the motor when the bracket was replaced, and also because of the possibility of making incorrect connections.

The new terminal board has the further advantage that only a single type of board is required which can be used for many types of motors and connections with minor modifications of the wiring on the board itself. The connection of the motor by the user is also greatly simplified and facilitated since only two line terminals are required, so that incorrect connections to the line are impossible, and the direction of rotation and the voltage can readily be changed by means of the plug connections shown with little possibility of error. The simplified construction and wiring results in giving more room in the terminal box itself, facilitating the connections and making it possible for the user to easily add other devices, such as a line switch, if desired. Thus the new terminal board construction has many advantages and effects a major saving in cost as well as providing a better and simpler motor construction.

A preferred embodiment of the invention has been shown and described for the purpose of illustration, but it will be apparent that various modifications are possible within the scope of the invention. Thus, a harness wired terminal board has been shown, that is, the circuit connections on the terminal board itself are made by means of conductors extending between the various terminals and devices and carried on the board. It will be obvious, however, that the circuit connections might be applied directly to the board itself by printed circuit techniques. If this were done, the direction of rotation and the voltage could be changed by simple switching devices mounted directly on the board rather than by the plug and socket means shown. Other means of effecting the circuit connections on the terminal board might also be used and will be apparent to those skilled in the art, and all such modifications and embodiments are within the scope of the invention.

I claim as my invention:

1. A single-phase electric motor having a frame member, end brackets at the ends of the frame member, a stator core in the frame member, main and auxiliary primary windings on the stator core, a terminal board supported from the frame member adjacent one of the end brackets, the terminal board being accessible through an opening in said one end bracket, two terminal studs on the terminal board for connection to an external circuit, first and second terminal devices on the terminal board, said auxiliary primary winding being directly connected to said first and second terminal devices, a switching device mounted on the terminal board, the first terminal device being permanently connected to the switching device, connecting means carried by the terminal board for alternatively connecting the switching device to either of said terminal studs and for connecting the second terminal devices to the other of said terminal studs, third and fourth terminal devices on the terminal board, said main primary winding being directly connected to the third and fourth terminal devices, and means on the terminal board for permanently connecting the third terminal device to one of the terminal studs and for permanently connecting the fourth terminal device to the other of the terminal studs.

2. A single-phase electric motor having a frame member, end brackets at the ends of the frame member, a stator core in the frame member, main and auxiliary primary windings on the stator core, a terminal board supported from the frame member adjacent one of the end brackets, the terminal board being accessible through an opening in said one end bracket, two terminal studs on the terminal board for connection to an external circuit, first and second terminal devices on the terminal board, said auxiliary primary winding being directly connected to said first and second terminal devices, a switching device mounted on the terminal board, the first terminal device being permanently connected to the switching device, first and second connecting devices on the terminal board, means for connecting the first connecting device to one of said terminal studs and for connecting the second connecting device to the other of said terminal studs, means on the terminal board for alternatively connecting the switching device to either the first or second connecting device, means on the terminal board for alternatively connecting the second terminal device to either the second or first connecting device, third and fourth terminal devices on the terminal board, said main primary winding being directly connected to the third and fourth terminal devices, and means on the terminal board for permanently connecting the third terminal device to one of the terminal studs and for permanently connecting the fourth terminal device to the other of the terminal studs.

3. A single-phase electric motor having a frame member, end brackets at the ends of the frame member, a stator core in the frame member, main and auxiliary primary windings on the stator core, a terminal board supported from the frame member adjacent one of the end brackets, the terminal board being accessible through an opening in said one end bracket, two terminal studs on the terminal board for connection to an external circuit, first and second terminal devices on the terminal board, said auxiliary primary winding being directly connected to said first and second terminal devices, a switching device mounted on the terminal board, the first terminal device being permanently connected to the switching device, first and second connecting devices on the terminal board, means for connecting the first connecting device to one of said terminal studs and for connecting the second connecting device to the other of said terminal studs, means on the terminal board for alternatively connecting the switching device to either the first or second connecting device, means on the terminal board for alternatively connecting the second terminal device to either the second or first connecting device, third and fourth terminal devices on the terminal board, said main primary winding being directly connected to the third and fourth terminal devices, a protective device mounted on the terminal board, means on the terminal board for permanently connecting the third terminal device to the protective device, means for permanently connecting the protective device to one of the terminal studs, and means on the terminal board for permanently connecting the fourth terminal device to the other of the terminal studs.

4. A single-phase electric motor having a frame member, end brackets at the ends of the frame member, a stator core in the frame members, main and auxiliary primary windings on the stator core, a terminal board supported from the frame member adjacent one of the end brackets, the terminal board being accessible through an opening in said one end bracket, two terminal studs on the terminal board for connection to an external circuit, first and second terminal devices on the terminal board, said auxiliary primary winding being directly connected to said first and second terminal devices, a switching device mounted on the terminal board, the first terminal device being permanently connected to the switching device, connecting means carried by the terminal board for alternatively connecting the switching device to either of said terminal studs and for connecting the second terminal device to the other of said terminal studs, said main primary winding including two sections, third and fourth terminal devices on the terminal board, one section of the main primary winding being directly connected to the third and fourth terminal devices, fifth and sixth terminal devices on the terminal board, the other section of the main winding being directly connected to the fifth and sixth terminal devices, means on the terminal board for permanently connecting the third terminal device to one of the terminal studs and for permanently connecting the sixth terminal device to the other of the terminal studs, and connecting means carried by the terminal board for alternatively connecting the fourth and fifth terminal devices together or connecting the fourth terminal device to the same terminal stud as the sixth terminal device and the fifth terminal device to the other terminal stud.

References Cited in the file of this patent

UNITED STATES PATENTS

| 270,017 | Chertemps et al. | Jan. 2, 1883 |
| 1,488,498 | Hoff | Apr. 1, 1924 |
| 2,543,131 | Seifried | Feb. 27, 1951 |
| 2,552,028 | Blair | May 8, 1951 |
| 2,590,058 | Willits | Mar. 18, 1952 |
| 2,722,645 | Brown | Nov. 1, 1955 |

FOREIGN PATENTS

| 702,656 | Great Britain | Jan. 20, 1954 |
| 1,032,617 | France | Apr. 1, 1953 |